CONFERENCE CALL CIRCUIT

Filed Feb. 1, 1960 2 Sheets-Sheet 1

INVENTORS
E.M. PAULAITIS
L. LAMIN
BY
Wolfe, Hubbard, Voit & Osann
ATTORNEYS

March 26, 1963 E. M. PAULAITIS ET AL 3,083,265

CONFERENCE CALL CIRCUIT

Filed Feb. 1, 1960 2 Sheets-Sheet 2

INVENTORS
E.M. PAULAITIS
L. LAHIN
BY Wolfe, Hubbard, Voit & Osann
ATTORNEYS 3,083,265

CONFERENCE CALL CIRCUIT

Edward M. Paulaitis, Lombard, and Leonard Lamin, Chicago, Ill., assignors to International Telephone and Telegraph Corporation, New York, N.Y., a corporation of Maryland Filed Feb. 1, 1960, Ser. No. 5,866
9 Claims. (Cl. 179—1)

Figure 1A:
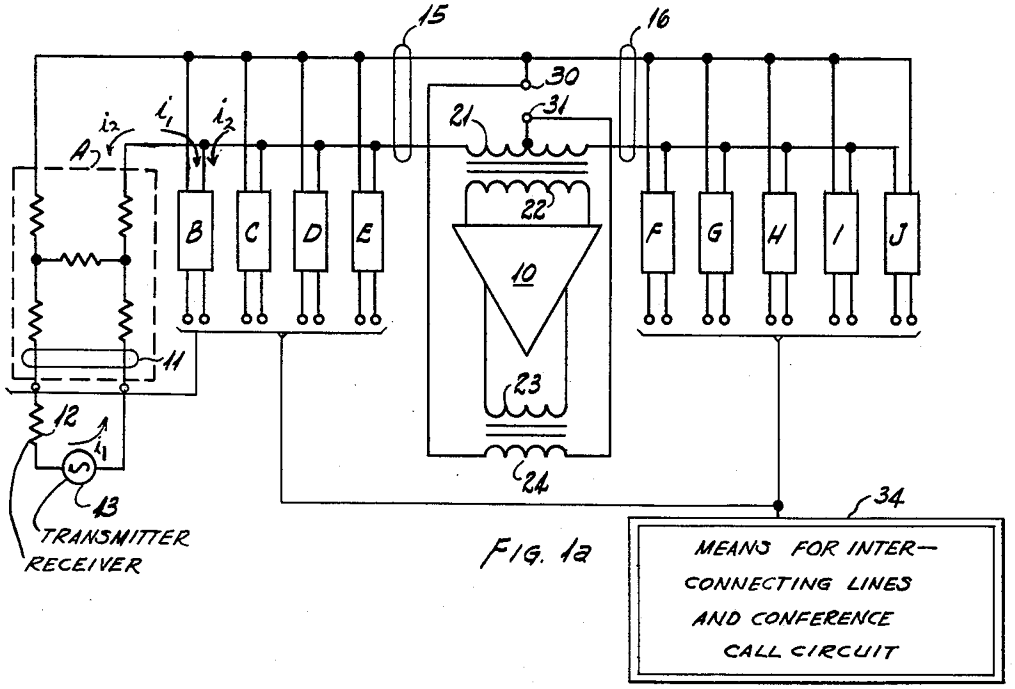

This invention relates to telephone systems and more particularly to conference call circuits for interconnecting large groups of subscriber lines.

In telephony, it is frequently necessary to interconnect more than two telephone lines in what is known as a conference circuit. Since each added line requires power, it is necessary to amplify voice signals appearing in the conference circuit and then to reintroduce the amplified signal without causing singing or oscillation. The problem is, of course, to prevent the amplified signal from being fed back into the amplifier to be reamplified. The usual procedure is to split the amplified signal into two equal parts which are bucked at the input of the amplifier to provide a zero current thereat and thus prevent such reamplification. However, it is impossible to have two equal currents unless it is possible to have substantially balanced circuit conditions, and it is most difficult to have balanced conditions in conference call circuits because the impedances of the individual lines inherently differ from each other. Also the impedances of the individual lines vary with age, humidity, etc. The problems are compounded many times as the number of lines in the conferenced group is increased.

In the past, attempts have been made to overcome these problems either by connecting each line through a balanced hybrid network to an individually associated amplifier, or by connecting all lines to a common amplifier through a single network having incremental balancing circuits which are added each time that a line is added. However, these arrangements are not entirely satisfactory because they entail high initial cost at the time of installation, and large power requirements during operation. Moreover, the probability of impedance mismatch creates narrow stability margins which severely limit the number of lines that may be conferenced.

Accordingly, it is an object of this invention to provide new and improved conference call circuits.

Another object of this invention is to interconnect the four terminals (i.e. two input and two output) of an amplifier and the two terminals of each line of a group of subscriber lines with minimum impedance mismatch or circuit instability.

Still another object of this invention is to provide means for interconnecting groups of lines in conference circuits when both the number of lines per group and the impedance of the lines vary over a wide range.

In accordance with this invention, a portion of a plurality of subscriber lines which is to be connected in a conference circuit are coupled to a first plural conductor line and the remainder of the plurality of subscriber lines are coupled to a second plural conductor line via pads or other means which are designed to reduce the effects of line disturbances or impedance mismatches and thus minimize the probability of disrupting signals appearing on the plural conductor lines. The plural conductor lines are interconnected through a network comprising a hybrid transformer and a constant current amplifier circuit in a manner which is such that a first group of subscriber lines connected to a first plural conductor line is balanced against a second group of subscriber lines which is connected to a second plural conductor line. This means of interconnecting a plurality of subscriber lines increases the probability of impedance matching since the random impedance of the two groups of lines tend to give a greater degree of uniformity to the balancing arrangement. In further embodiments of the invention, the principles described hereinafter are utilized any time that it is necessary to amplify signals derived from a source and then to feed the amplified signals to several loads.

Figure 1B:
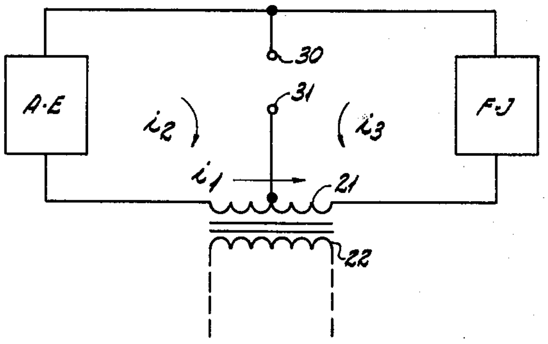
Figure 2:
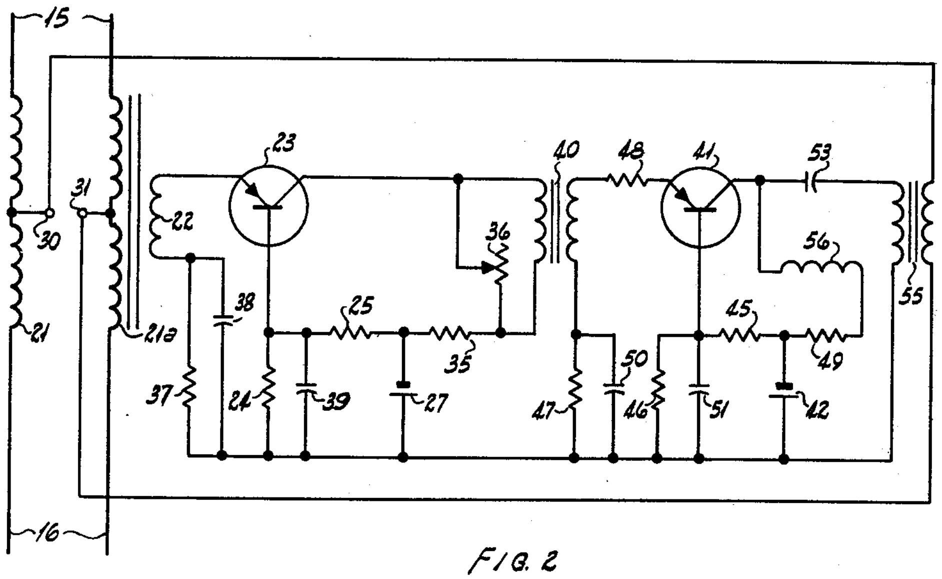
Figure 3:
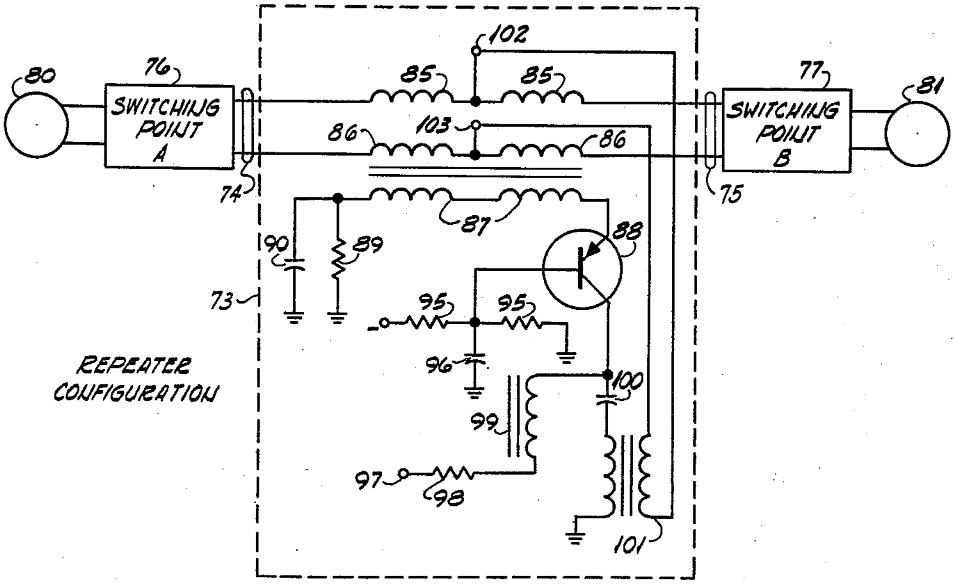

The above mentioned and other objects of this invention together with the manner of obtaining them will become more apparent and the invention itself will be best understood by making reference to the following description of two embodiments of the invention taken in conjunction with the accompanying drawings in which:

FIGURE 1*a* shows by block diagram a conference call circuit for interconnecting a plurality of subscriber lines;

FIG. 1*b* is the block diagram of FIG. 1*a* which has been redrawn to indicate the flow of currents therein;

FIG. 2 shows the circuitry of a constant current amplifier which may be used to complete hollow box 10 of FIG. 1*a*; and FIG. 3 shows a second embodiment of the invention having a configuration for inserting a repeater in a trunk line.

Briefly, the principles of the invention are set forth in the block diagram of FIG. 1*a* which shows an exemplary subscriber line 11 having receiver 12, transmitter 13 and being connected to a two conductor line 15 via pad A. Use of the pad makes it feasible to employ a higher amplifier gain without unduly jeopardizing the circuit stability. The higher gain improves the power transfer symmetry of the system. The pad also protects two conductor line 15 and consequently everything coupled thereto from catastrophic disrupting conditions which may appear on any subscriber line such as line 11, e.g. if a short should develop across line 11 and no pad were present, the entire two conductor line 15 would be shorted and the conference call impossible. On the other hand, with pad A connected in the circuit as shown, a short circuit on line 11 has a minimum effect upon the total impedance appearing across two conductor line 15. A secondary reason for including pad A is to cause line 11 to present a more nearly standard impedance to two conductor line 15.

Other subscriber lines are not shown; however, each is connected to two conductor lines 15 or 16 through an individually associated pad, there being a total of ten such pads identified by the letters A–J. Although these ten pads provide means for connecting up to five subscriber lines to each of the two conductor lines 15 and 16, it should be understood that such showing is exemplary only—any suitable number may be provided.

In operation, voice signals originating on each subscriber line, as in transmitter 13, for example, are applied to a two conductor line such as line 15 through an associated pad. A portion of the signal current flowing through the two conductor lines 15 and 16 and hence in sensing winding 21 is inductively transferred to hybrid winding 22 which is connected to the input of amplifier 10. This signal current is then amplified in constant current amplifier 10 and reintroduced into both two conductor lines 15 and 16 through output transformer windings 23, 24 and points 30, 31, thereby compensating for the loss of signal strength caused by the addition of lines to the conference circuit. Since point 31 is a center tap on hybrid winding 21 and further since the group of lines connected through pads A–E balances the group connected through pads F–J, the amplified currents divide equally and flow oppositely in bucking relation so that there will be no feedback of the amplified signal through hybrid winding 22 and into the constant current amplifier.

In greater detail, the lines and pads may be interconnected by any suitable means (here symbolically shown by box 34), such as a dial controlled switch train, a preset or multiply jacked conference circuit, or a trunk circuit controlled repeater insertion means. While the nature of such switching means is not material to the invention, it is important that lines be connected in the two groups with successive connections being made to two conductor line 15 and to two conductor line 16 on the opposite sides of amplifier 10. That is, if the first line to be connected in the conference call circuit is connected via pad A, the second line will be connected via pad J, the third line via pad B, the fourth line via pad I, etc. It will be noted that by connecting the subscriber lines in the manner described above, there will be two groups of lines each having substantially the same total impedance. This means interconnecting the subscriber lines and conference call circuit increases the probability of impedance matching since the impedance of the two randomly selected groups of lines give a degree of uniformity not available heretofore.

Means are provided for interconnecting the four input and output terminals of amplifier 10 with the two terminals of each subscriber line. More particularly between two conductor line 15 and two conductor line 16 and therefore between the two groups of subscriber lines, there is shown a hybrid network including windings 21 and 22. Preferably, sensing winding 21, which is in series with two conductor line 15 and two conductor line 16 presents a low impedance to minimize attenuation of the voice signal. Winding 24 which is the secondary of the output transformer of constant current amplifier 10 is in parallel with the subscriber lines and presents a high impedance across the conductors of two conductor line 15 and two conductor line 16; thus, not materially changing the impedance thereof. Hence, the introduction of the hybrid network comprising windings 21 and 22 and constant current amplifier 10 has a minimum effect upon the two conductor lines 15 and 16.

For a more complete understanding of how currents flow through the hybrid network, reference is made to FIG. 1*b* which shows pads A–E as being lumped as a first impedance and pads F–J as being lumped as a second impedance. In operation, signals originating on subscriber lines, flow as current $i_1$ through a series circuit including winding 21. The signal is, therefore, applied by inductive coupling across windings 21 and 22 to the input of amplifier 10. On the other hand, the amplified current which is reintroduced through windings 23, 24 into the line at terminals 30, 31 divides into two equal parts $i_2$ and $i_3$. Since current $i_2$ bucks current $i_3$ in winding 21 substantially no signal is inductively transferred to winding 22, and the circuit remains stable.

Upon inspection of FIG. 1*b*, it will be apparent that whether current $i_2$ does, in fact, equal current $i_3$ depends to a large extent upon how nearly the impedance A–E equals the impedance F–J. In typical configurations that have been used in the past, all lines are connected to one side of the hybrid network (as at A–E) and incremental balancing circuits are connected to the other side of the hybrid circuit (as at F–J), there being one balancing circuit for each subscriber line. If the impedance of an incremental balancing circuit and the impedance of the balanced subscriber line are substantially identical, there is no problem. On the other hand, in such prior circuits, if the incremental balancing circuit and the balanced subscriber line have appreciably different impedances, there is a mismatch and a very serious problem because currents $i_2$ and $i_3$ do not completely cancel, the amplified signal is fed back into the amplifier via winding 22, and the circuit goes into oscillation.

To minimize the problems caused by impedance mismatch, the subject invention does not rely upon incremental balancing circuits, each having a fixed impedance; rather, the subscriber lines are divided into two equal groups which are balanced against each other. Both groups of lines will have insulation which has aged in the same manner, both groups are exposed to the same weather conditions, etc. Therefore, the total variation between balance-impedances is far less, when randomly selected lines are balanced against each other as shown in FIG. 1*a*, than it is in typical prior systems wherein fixed incremental balancing impedances are used.

Sidetone is also controlled by the direction of current flow. That is, as shown in FIG. 1*a*, the voice signal $i_1$ originates in the transmitter 13 of the station where a subscriber is then talking. Amplified signal $i_2$ is bucking current $i_1$ on line 11 and the subscriber hears—as a controlled sidetone—voice signals resulting from current of reduced amplitude in receiver 12. All other subscribers hear the voice signals at full amplitude since both the original and the amplified signals flow in the same direction on their lines, as indicated by arrows $i_1$ and $i_2$ which are shown as entering pad B in FIG. 1*a*.

The details of a circuit which may be utilized to complete amplifier 10 is shown in FIG. 2; however, it should be understood that such showing is exemplary only and that other suitable amplifiers may be utilized also. In greater detail, unamplified voice currents flowing over two conductor line 15 are inductively transferred from windings 21, 21*a* to winding 22 and the emitter of transistor 23, which is shown as a PNP junction device. Preferably, transistor 23 is connected as a common base amplifier since such configuration includes the lowest input impedance and the highest output impedance; therefore, the series current $i_1$ is not attenuated appreciably thereby and the impedance of two conductor line 15 remains substantially unchanged.

The proper biasing potentials are applied to transistor 23 from battery 27, i.e. a voltage divider 24 and 25 provides base bias, resistance 37 is connected to stabilize the emitter current and the collector voltage is applied through resistance 35, potentiometer 36 and transformer 40. The potentiometer 36 is a gain control. Capacitors 38 and 39 are bypass capacitors. The output of transistor 23 is coupled through transformer 40 to the input of a second common base transistor amplifier 41 again to provide minimum input impedance and maximum output impedance. The biasing potentials for transistor 41 are derived from battery 42 which is connected across a base biasing voltage divider including resistances 45, 46, emitter biasing resistances 47, 48, and a collector biasing circuit including resistance 49 and inductance 56. Capacitors 50 and 51 are bypass capacitors. Capacitor 53 is provided to isolate transformer 55 from the D.C. potential of battery 42, thereby allowing a smaller transformer to be used.

It should be understood that configurations similar to that of FIG. 1*a* may be used any time when it is necessary to amplify signals flowing in a circuit which is subject to unbalanced conditions. To illustrate this broader aspect of the invention, reference is made to FIG. 3 which shows a repeater configuration 73 connected into trunk lines 74 and 75 that extend between switching points 76, 77. Although subscriber lines 80, 81 are shown as being connected to switching points 76 and 77, it should be understood that any suitable devices may be connected thereto such as an operator controlled switchboard, a tape recorder, remote metering equipment, or the like. As in previous configurations, hybrid windings 85 and 86 are connected in series with cables 74 and 75 to sense current flowing therein. Inductively coupled winding 87 is connected to the input electrode or emitter of common base transistor amplifier 88. The emitter bias is applied through resistance 89 which has filter capacitor 90 connected in parallel therewith. The base bias is derived from voltage divider 95 and the collector bias is applied from battery 97 through resistance 98 and inductance 99.

Coupling capacitor 100 is provided to isolate transformer 101 from the D.C. potential of battery 97.

The output signal applied through transformer 101 is fed back to central points 102, 103 of windings 85, 86 where the amplified current divides to provide two bucking currents. Hence, the amplified signal is not induced in winding 87 and there is no feedback to cause oscillation or singing.

While the principles of the invention have been described above in connection with specific apparatus, it is to be clearly understood that this description is made only by way of example and not as a limitation to the scope of the invention.

We claim:

1. A telephone system comprising a plurality of subscriber lines, a plurality of plural conductor lines, means for coupling a group of said subscriber lines to a first of said plural conductor lines, means for coupling another group of said subscriber lines to a second of said plural conductor lines, means comprising an amplifier having a low input impedance characteristic and a high output impedance characteristic for amplifying signals appearing on said plural conductor lines, current transformer means comprising center tap from a primary winding means and secondary winding means, means including said primary winding means for coupling said first and second plural conductor lines and for sensing current flow over said lines and means including said center tap for reintroducing said amplified signals to said connected lines.

2. The telephone system of claim 1 and a plurality of attenuating pads, said pads being connected between individually associated ones of said subscriber lines and said conductor lines whereby higher amplifier gain is feasible with consequent improved power transfer symmetry.

3. A telephone system comprising a number of plural conductor lines, an equal number of a plurality of subscriber lines connected in parallel across each of said plural conductor lines, a plurality of attenuating pads, said pads being connected between individually associated ones of said subscriber lines and said plural conductor lines thereby protecting said plural conductor lines from catastrophic conditions on said subscriber lines, a hybrid network, for interconnecting said plural conductor lines, a constant current amplifier coupled to said hybrid whereby all of said subscriber lines are coupled to said amplifier through said plural conductor lines and said equal numbers of subscriber lines being connected to balance said hybrid network.

4. A telephone system comprising a plurality of subscriber lines connected to plural line conductors, means for coupling said plural line conductors, means comprising a constant current amplifier having a low input impedance and a high output impedance for amplifying signals appearing on said plural line conductors, means including said coupling means and said low input impedance for sensing current flow over said plural line conductors and means for reintroducing amplified signals to said plural line conductors via said high output impedance, said last named means comprising means for splitting said reintroduced signals into two equal and bucking portions thereby preventing reamplification of said amplified signal.

5. The telephone system of claim 4 and a plurality of attenuating pads, said pads being connected between individually associated ones of said lines and said plural conductor lines thereby protecting said plural conductor lines and said associated subscriber lines from catastrophic conditions on any of said subscriber lines and improving power transfer symmetry of the system.

6. A conference call circuit comprising a constant current amplifier having input and output terminals, a hybrid network, two plural conductor lines connected by said hybrid, means comprising said hybrid network for coupling said input terminals in series with said plural conductor lines and said output terminals in parallel with said plural conductor lines, both said series and said parallel couplings being made at said connection point of said two plural conductor lines, and means for connecting two groups of subscriber lines having matched impedance to each of said plural conductor lines on each side of said series and parallel couplings whereby said two groups of subscriber lines are coupled to said hybrid network to balance each other.

7. A conference call circuit comprising a constant current amplifier having two input and two output terminals, a multiwinding hybrid network, two plural conductor lines connected through said hybrid, means comprising at least one of the windings of said hybrid network for inductively coupling said input terminals in series with said plural conductor lines and said output terminals in parallel with said plural conductor lines, said parallel coupling being made to a center tap on said one winding, said one winding being connected at a point on said conductor lines intermediate to the ends thereof, and means for connecting two groups of subscriber lines to each of said plural conductor lines on each side of said series and parallel couplings, the total impedances of each of said groups of lines being substantially equal to each other.

8. A conference call circuit comprising two groups of subscriber lines connected respectively to two plural conductor lines so that each of said plural conductor lines have substantially equal impedance, a constant current amplifier connected intermediate to and in series with said plural conductor lines whereby the impedance of the subscriber lines connected to one of said plural conductor lines balances the impedance of the subscriber lines connected to the other of said plural conductor lines, at least one transistor having emitter, base and collector electrodes, said amplifier including said transistor connected as a common base transistor amplifier stage, a hybrid network having at least one winding connected in series with said plural conductor lines, means including another winding of said network inductively coupled to said one winding for applying an input signal to the emitter of said transistor, and means including third windings of said hybrid network coupled to the collector of said transistor for applying an amplified signal from said amplifier through a midpoint of said one winding to said plural conductor lines.

9. A telephone system comprising a trunk line including two conductors, a hybrid network having a winding in series with each of said conductors intermediate the ends thereof, a constant current amplifier having input and output terminals, means including another winding of said hybrid network inductively coupled to said series connected windings for applying signals appearing on said trunk line to said input terminals, means for coupling said output terminal to center taps of said series windings, and means for connecting telephonic equipment to said trunk line on each side of said series windings, whereby said telephonic equipment is connected to balance said hybrid network.

References Cited in the file of this patent

Electrical Communication, 2nd edition (Albert), John Wiley and Sons, New York, 1940 (pages 436 and 437).

Electrical Communication, 3rd edition (Albert), 1950, John Wiley and Sons (pages 403, 404 and Fig. 8 relied on).